(12) United States Patent
Watanabe et al.

(10) Patent No.: US 8,991,053 B2
(45) Date of Patent: *Mar. 31, 2015

(54) CHARGING MEMBER, PROCESS FOR ITS PRODUCTION, AND ELECTROPHOTOGRAPHIC APPARATUS

(71) Applicant: Canon Kabushiki Kaisha, Tokyo (JP)

(72) Inventors: Hiroaki Watanabe, Odawara (JP); Masaaki Harada, Yokohama (JP); Takumi Furukawa, Susono (JP); Keiji Nose, Machida (JP); Kenya Terada, Suntou-gun (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/915,563

(22) Filed: Jun. 11, 2013

(65) Prior Publication Data

US 2013/0272747 A1    Oct. 17, 2013

Related U.S. Application Data

(63) Continuation of application No. PCT/JP2012/005674, filed on Sep. 7, 2012.

(30) Foreign Application Priority Data

Dec. 22, 2011 (JP) ................................. 2011-281780

(51) Int. Cl.
*B23P 17/00* (2006.01)
*F16C 13/00* (2006.01)
(Continued)

(52) U.S. Cl.
CPC .............. *G03G 5/02* (2013.01); *G03G 15/0233* (2013.01); *B05D 5/00* (2013.01)

USPC .......... 29/895.32; 29/895.3; 492/28; 492/30; 492/37; 492/49; 492/53; 492/56; 399/176

(58) Field of Classification Search
USPC .......... 492/53, 30, 37, 28, 56, 49, 60; 29/895, 29/895.32, 895.3; 399/111, 176, 115, 116
See application file for complete search history.

(56) References Cited

U.S. PATENT DOCUMENTS

| 5,198,685 A | 3/1993 | Kitani et al. |
| 5,940,662 A * | 8/1999 | Hano et al. ..................... 399/175 |

(Continued)

FOREIGN PATENT DOCUMENTS

| JP | 9-160355 A | 6/1997 |
| JP | 2003-228213 A | 8/2003 |

(Continued)

OTHER PUBLICATIONS

International Preliminary Report on Patentability and Written Opinion of the International Searching Authority, International Application No. PCT/JP2012/005674, Mailing Date Oct. 9, 2012.

(Continued)

*Primary Examiner* — Sarang Afzali
(74) *Attorney, Agent, or Firm* — Fitzpatrick, Cella, Harper and Scinto (57) ABSTRACT

To provide a charging member that can not easily cause faulty cleaning on a photosensitive member while having a flexibility high enough to form a nip between it and the photosensitive member in a sufficient width. The charging member has an electro-conductive support and an elastic layer that is a surface layer, which elastic layer has at its surface a region having been cured by irradiation with electron rays, where this region supports spherical polyethylene particles in such a state that the spherical polyethylene particles are exposed to the surface of the elastic layer, thereby making the surface roughened.

8 Claims, 3 Drawing Sheets

(51) Int. Cl.
G03G 15/02 (2006.01)
G03G 5/02 (2006.01)
B05D 5/00 (2006.01)

(56) References Cited

U.S. PATENT DOCUMENTS

| | | | |
|---|---|---|---|
| 7,364,791 B2 * | 4/2008 | Shimamura et al. | 428/323 |
| 7,486,911 B2 | 2/2009 | Harada | |
| 7,547,496 B2 * | 6/2009 | Asano et al. | 430/45.1 |
| 7,693,457 B2 | 4/2010 | Kuruma et al. | |
| 7,962,068 B2 | 6/2011 | Kuroda et al. | |
| 8,376,922 B2 | 2/2013 | Akama et al. | |
| 8,440,307 B2 | 5/2013 | Nose et al. | |
| 8,445,113 B2 | 5/2013 | Furukawa et al. | |
| 8,481,167 B2 | 7/2013 | Watanabe et al. | |
| 8,491,994 B2 | 7/2013 | Harada et al. | |
| 8,501,312 B2 | 8/2013 | Watanabe et al. | |
| 8,532,535 B2 | 9/2013 | Nose et al. | |
| 8,538,298 B2 * | 9/2013 | Harada et al. | 399/176 |
| 2008/0292366 A1 * | 11/2008 | Akama et al. | 399/286 |
| 2011/0176833 A1 | 7/2011 | Harada et al. | |
| 2012/0045250 A1 | 2/2012 | Harada et al. | |
| 2012/0076539 A1 | 3/2012 | Sato et al. | |
| 2013/0287444 A1 | 10/2013 | Suzuki et al. | |
| 2013/0310239 A1 | 11/2013 | Terada et al. | |

FOREIGN PATENT DOCUMENTS

| | | |
|---|---|---|
| JP | 2004-61640 A | 2/2004 |
| JP | 2005-300667 A | 10/2005 |
| JP | 2010-231007 A | 10/2010 |
| JP | 2010-256617 A | 11/2010 |
| WO | 2006/001171 A1 | 1/2006 |
| WO | 2012/008122 A1 | 1/2012 |

OTHER PUBLICATIONS

International Preliminary Report on Patentability, International Application No. PCT/JP2012/005674, Mailing Date Jul. 3, 2014.
Harada, et al., U.S. Appl. No. 13/843,892, filed Mar. 15, 2013.
Nose, et al., U.S. Appl. No. 13/911,806, filed Jun. 6, 2013.
Harada, et al., U.S. Appl. No. 13/695,781, filed Jun. 11, 2013.

* cited by examiner

CHARGING MEMBER, PROCESS FOR ITS PRODUCTION, AND ELECTROPHOTOGRAPHIC APPARATUS

CROSS-REFERENCE TO RELATED APPLICATIONS

This application is a continuation of International Application No. PCT/JP2012/005674, filed Sep. 7, 2012, which claims the benefit of Japanese Patent Application No. 2011-281780, filed Dec. 22, 2011.

BACKGROUND OF THE INVENTION

1. Field of the Invention

This invention relates to a charging member used in electrophotographic apparatus and the like, a process for its production, and an electrophotographic apparatus.

2. Description of the Related Art

In electrophotographic image forming apparatus, it is common that a charging member used in the contact charging of a photosensitive member or the like is provided with an elastic layer containing a rubber, a thermoplastic elastomer or the like, in order to secure a uniform nip between it and such a charging object member and prevent the charging object member from being scratched. However, a toner and its external additives tend to adhere to the surface of such an elastic layer. Also, where the elastic layer and the electrophotographic photosensitive member are kept in contact with each other at rest over a long period of time, the elastic layer may come to deform permanently (undergo permanent set) at its part kept in contact. For such a phenomenon, as disclosed in Japanese Patent Application Laid-Open No. H09-160355, a charging member is proposed the surface of an elastic layer of which is irradiated with energy rays such as ultraviolet rays or electron rays to provide a surface modified layer.

SUMMARY OF THE INVENTION

However, studies made on the charging member according to Japanese Patent Application Laid-Open No. H09-160355 have revealed that such a charging member may cause faulty cleaning on the electrophotographic photosensitive member. Such faulty cleaning coming about on the electrophotographic photosensitive member refers to a phenomenon that any residual toner on the surface of the electrophotographic photosensitive member, which fundamentally should have been removed with an elastic blade, slips through the elastic blade to lower the grade of electrophotographic images formed through subsequent cycles of electrophotographic image formation.

Accordingly, the present invention is directed to providing a charging member that can not easily cause faulty cleaning on the electrophotographic photosensitive member while having a flexibility high enough to form a nip between it and the electrophotographic photosensitive member in a sufficient width, and provide a process for its production.

Further, the present invention is directed to providing an electrophotographic apparatus that can stably form high-grade electrophotographic images over a long period of time as it may less cause any lowering of charging performance with time.

According to one aspect of the present invention, there is provided a charging member comprising an electro-conductive support and an elastic layer as a surface layer, wherein; the elastic layer has a cured region on the surface of the elastic layer, the cured region having been cured by irradiation with electron rays, the cured region supporting spherical polyethylene particles in such a state that the spherical polyethylene particles are exposed to the surface of the elastic layer, and the surface is thereby roughened.

According to another aspect of the present invention, there is provided a process for producing a charging member comprising an electro-conductive support and an elastic layer as a surface layer, the elastic layer having a cured region on the surface of the elastic layer, the cured region having been cured by irradiation with electron rays, and the cured region supporting spherical polyethylene particles in such a state that the spherical polyethylene particles are exposed to the surface of the elastic layer, and the surface being thereby roughened; the process comprising the steps of:

(1) forming on the electro-conductive support a rubber layer containing the spherical polyethylene particles;

(2) sanding the surface of the rubber layer to make part of the spherical polyethylene particles exposed to the surface; and (3) irradiating with electron rays the surface of the rubber layer to which part of the spherical polyethylene particles stand exposed, obtained by the step (2), to form at the surface of the rubber layer the cured region.

According to further aspect of the present invention, there is provided an electrophotographic apparatus comprising the above charging member, and a charging object member disposed in contact with the charging member and being electrostatically chargeable by the charging member.

According to the present invention, it is able to obtain a charging member having been made to keep any faulty cleaning from coming about while having a flexible surface that is enough to form a nip between it and the electrophotographic photosensitive member in a sufficient width.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

The present inventors have made many studies on the reason why the charging member according to Japanese Patent Application Laid-Open No. H09-160355 has caused the faulty cleaning. As the result, they have assumed the mechanism therefor as stated below.

Figure 2:
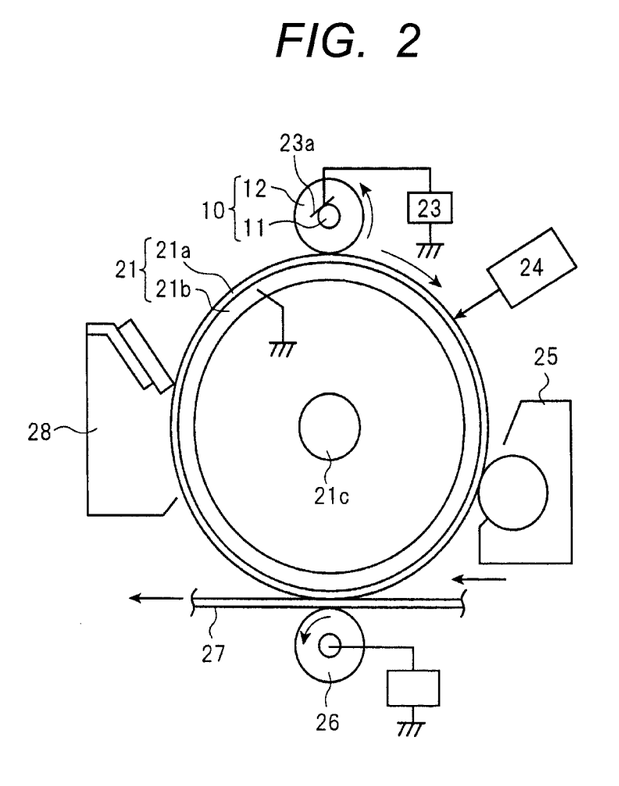
FIG. 2 is a schematic view showing an example of the construction of an electrophotographic apparatus having a charging member.

An example of the construction of an electrophotographic apparatus having the charging member of the present invention is schematically shown in FIG. 2. Reference numeral 21 denotes an electrophotographic photosensitive member serving as a charging object member. This electrophotographic photosensitive member is a drum-shaped electrophotographic photosensitive member having, as basic constituent layers, an electro-conductive support 21b and a photosensitive layer 21a formed on the electro-conductive support 21b. Then, it is rotatingly driven around a shaft 21c in the clockwise direction as viewed on the drawing, at a stated peripheral speed.

A charging roller 10 that is a roller-shaped charging member is so disposed as to be able to charge the electrophotographic photosensitive member 21 electrostatically. Here, the charging roller 10 is kept in contact with the electrophotographic photosensitive member 21. Then, the electrophotographic photosensitive member is charged to stated polarity and potential (primary charging). The charging roller 10 is constituted of a mandrel 11 and an elastic layer (elastic material layer) 12 formed on the mandrel 11, and is kept pressed against the electrophotographic photosensitive member 21 under application of pressure at both end portions of the mandrel 11 by means of a press-down means (not shown) and follow-up rotated as the electrophotographic photosensitive member is rotatingly driven.

A stated direct-current (DC) bias is applied to the mandrel 11 from a power source 23 through a rubbing-friction electrode 23a, whereupon the electrophotographic photosensitive member 21 is electrostatically charged to stated polarity and potential. The electrophotographic photosensitive member 21 the peripheral surface of which has electrostatically been charged by means of the charging roller 10 is subsequently subjected to exposure (such as laser beam scanning exposure, or slit exposure of images of an original) of intended image information by means of an exposure means 24, whereupon electrostatic latent images corresponding to the intended image information are formed on its peripheral surface.

The electrostatic latent images are then successively developed into visible images as toner images by means of a developing assembly 25. The toner images thus formed are then successively transferred by a transfer means 26 to a transfer material 27 having been transported from a paper feed means section (not shown) to a transfer zone between the electrophotographic photosensitive member 21 and the transfer means 26 at proper timing in the manner synchronized with the rotation of the electrophotographic photosensitive member 21. The transfer means 26 shown in FIG. 2 is a transfer roller, which is charged to a polarity reverse to that of toner from the back of the transfer material 27, whereupon the toner images on the side of the electrophotographic photosensitive member 21 are transferred on to the transfer material 27.

The transfer material 27 to which the toner images have been transferred is separated from the electrophotographic photosensitive member 21 and then transported to a fixing means (not shown), where the toner images are fixed, and the transfer material with fixed images is put out as an image-formed matter. Instead, where images are also formed on the back, the transfer material with fixed images is transported to a means for re-transporting it to the transfer zone.

The peripheral surface of the electrophotographic photosensitive member 21 from which the toner images have been transferred is subjected to pre-exposure by a pre-exposure means (not shown), whereby electric charges remaining on the electrophotographic photosensitive member drum are removed (destaticized). As this pre-exposure means, any known means may be used, which may preferably be exemplified by an LED chip array, a fuse lamp, a halogen lamp and a fluorescent lamp.

The peripheral surface of the electrophotographic photosensitive member 21 thus destaticized is cleaned on its surface by removing any toner remaining on the surface of the photosensitive member 21 by means of a cleaning member 28 typified by an elastic blade. It comes that, on the photosensitive member 21 having been cleaned on its surface, a next-cycle electrophotographic image formation process is carried out.

In a course of the above electrophotographic image formation process, the charging roller charges the surface of the photosensitive member electrostatically by making discharge take place at gaps formed about a nip between it and the photosensitive member 21. On that occasion, any discharge products coming about in the vicinity of the charging roller, any wear dust left on the photosensitive member surface, and so forth adhere to the surface of the photosensitive member. Then, these are pressed against the surface of the photosensitive member at the nip between the charging roller and the photosensitive member, whereby they continue to be accumulated on the surface of the photosensitive member. Then, the coefficient of friction between the photosensitive member and the elastic blade continues to become higher gradually. In due course, the elastic blade begins to vibrate because of a high coefficient of friction between the photosensitive member and the elastic blade, so that the residual toner on the surface of the photosensitive member comes not to be sufficiently removed. As the result, it follows that the next-cycle electrophotographic image formation process is carried out on the photosensitive member to the surface of which the residual toner has adhered.

Here, such an increase in the coefficient of friction between the photosensitive member and the elastic blade has remarkably come out in a charging roller having a surface layer formed of an elastic material. The reason therefor is considered to be the following: The charging roller having a surface layer formed of an elastic material has so flexible a surface as to come to have a large area of contact at the nip between the charging roller and the photosensitive member, so that any substances causative of an increase in the coefficient of friction, such as discharge products, may more easily be made to stick to the surface of the photosensitive member.

Accordingly, the present inventors have made various studies at an aim to obtain a charging member that may make any discharge products not easily stick to the surface of the photosensitive member, though having flexibility for securing an appropriate nip between it and the photosensitive member.

As the result, they have discovered that the above objects can be achieved by a charging member having as a surface layer an elastic layer having the following constitution. That is, it is an elastic layer having at its surface a region having been cured by irradiation with electron rays, where this region supports spherical polyethylene particles (spherical PE particles) in such a state that the particles are exposed to the surface of the elastic layer, and the surface stand roughened in virtue of such spherical PE particles.

Preferred embodiments of the present invention are described below.

Charging Member

The charging member according to the present invention has an electro-conductive support and an elastic layer that is a surface layer. Also, the elastic layer has at its surface a region having been cured by irradiation with electron rays, and, about at least part of particles among the spherical PE particles, part of each particle is supported by the region having been cured, in such a state as to be exposed to the surface of the elastic layer. Then, the surface of the elastic layer stands roughened by the spherical PE particles. The elastic layer used in the present invention may be an electrically conductive elastic layer. The elastic layer may also be formed by, e.g., sanding a vulcanized rubber layer obtained by vulcanizing a layer of an unvulcanized rubber composition containing the spherical PE particles, and further irradiating the surface of this vulcanized rubber layer with electron rays.

The shape of the charging member of the present invention may appropriately be selected, which may be, e.g., roller-shaped or belt shaped. In the following, the present invention is described taking note of a roller-shaped charging member (charging roller).

Figure 1:
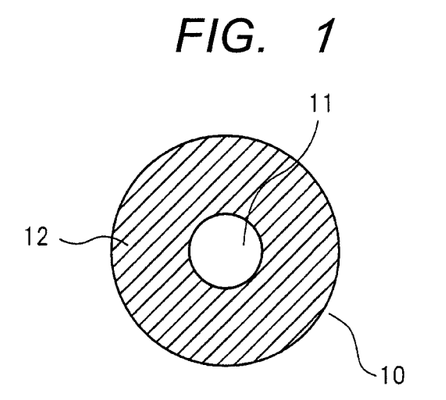
FIG. 1 is a diagrammatic sectional view showing an example of the constitution of the charging member according to the present invention.

An example of the constitution of a charging roller as the charging member of the present invention is schematically shown in FIG. 1. A charging roller 10 is constituted of a mandrel 11 and an elastic layer 12 formed on the mandrel 11. The charging member according to the present invention may be used as the charging roller 10 of the electrophotographic apparatus shown in FIG. 2.

Figure 3A:
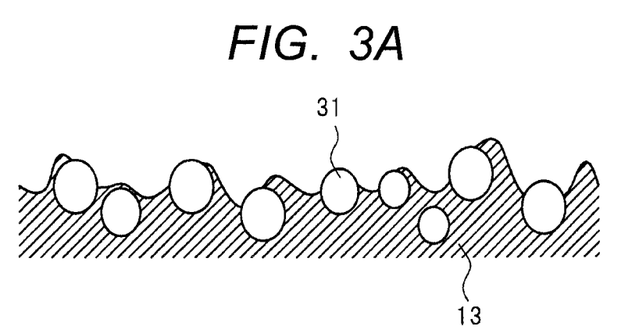
FIG. 3A is a diagrammatic sectional view showing a form of the surface portion of the charging member according to the present invention.
Figure 3B:
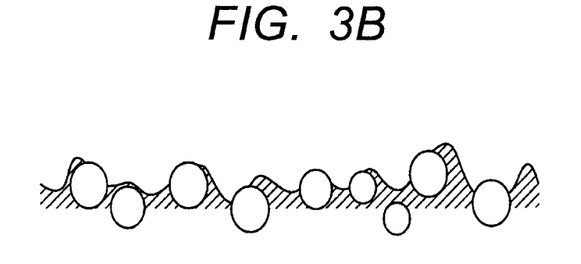
FIG. 3B is a diagrammatic sectional view showing another form of the surface portion of the charging member according to the present invention.

FIGS. 3A and 3B are diagrammatic views showing forms of the surface portion of the charging roller of the present invention.

The elastic layer of the charging roller according to the present invention contains spherical PE particles 31, and its surface stands roughened by the spherical PE particles. Also, the surface of the elastic layer has been subjected to cure treatment by irradiation with electron rays, and, about at least part of particles among the above spherical PE particles, part of each particle is exposed to the surface of the elastic layer and also supported by the region having been cured by the irradiation with electron rays (a cured region 13), of the elastic layer.

Since the spherical PE particles are thus supported by the cured region 13, the spherical PE particles have been made not easily buried in the elastic layer at its nip even when the elastic layer comes into contact with the charging object member such as the photosensitive member. As the result, even at the nip, the spherical PE particles, having a high hardness, can maintain an unevenness profile of the surface in such a state that they are exposed in part to the surface of the elastic layer, and can make small its area of contact with the photosensitive member. Also, since the spherical PE particles are spherical in shape, the photosensitive member can be kept from being scratched or from wearing in excess on its surface even when the part standing uncovered from the surface of the elastic layer comes into direct contact with the photosensitive member.

The cure treatment by irradiation with electron rays enables the elastic layer to be cured only at its surface portion, thus the elastic layer can maintain a low hardness (50 or more to less than 80 in MD-1 hardness) at its interior, i.e., its deep layer portion. Hence, any faulty charging caused by faulty contact attendant to a decrease in width of the nip between the charging roller and the charging object member or any faulty images caused by the sticking of a toner or its external additives with time to the surface of the charging roller can be kept from occurring, which may be seen where the whole charging roller is made to have a high hardness, e.g., where the whole elastic layer is made to have a hardness of as high as 80 degrees or more in MD-1 hardness.

Conductive Support:

The electro-conductive support may be any one as long as it has conductivity, can support the elastic layer and so forth, and also can maintain strength required as the charging roller.

Elastic Layer:

The elastic layer may contain a base polymer or a cross-linked product thereof and the spherical PE particles. As the base polymer, a material may be used which can provide the elastic layer with rubber elasticity in the range of actual service temperature. Such a base polymer may include thermoplastic elastomers and thermosetting rubbers.

The thermosetting rubbers are rubber compositions obtained by compounding a raw-material rubber with a cross-linking agent. Here, specific examples of the raw-material rubber are given below: Natural rubber (NR), isoprene rubber (IR), butadiene rubber (BR), styrene-butadiene rubber (SBR), butyl rubber (IIR), an ethylene-propylene-diene terpolymer rubber (EPDM), an epichlorohydrin homopolymer (CHC), an epichlorohydrin-ethylene oxide copolymer (CHR), an epichlorohydrin-ethylene oxide-acrylic glycidyl ether terpolymer (CHR-AGE), an acrylonitrile-butadiene copolymer (NBR), a hydrogenated product of acrylonitrile-butadiene copolymer (H-NBR), chloroprene rubber (CR), acrylic rubbers (ACM, ANM) and so forth.

Specific examples of the thermoplastic elastomers are also given below: Thermoplastic elastomers such as thermoplastic polyolefin type thermoplastic elastomers, polystyrene type thermoplastic elastomers, polyester type thermoplastic elastomers, polyurethane type thermoplastic elastomers, polyamide type thermoplastic elastomers, and vinyl chloride type thermoplastic elastomers.

The elastic layer used in the present invention is incorporated with the spherical PE particles. The spherical PE particles may be polymer particles of polyethylene, and may be composed of polyethylene.

Regarding the sphericity of the spherical PE particles, they may preferably be from 100 or more to 160 or less as the value of shape factor SF1 shown below. Here, the shape factor SF1 is an index represented by equation (1) shown below, and means that, the closer to 100 it is, the closer to spheres the particles are. As long as their shape factor is not more than 160, the photosensitive member can more surely be kept from being scratched or kept from wearing even where the spherical PE particles stand exposed to the elastic layer surface and come into direct contact with the photosensitive member.

The shape factor SF1 of the spherical PE particles used in the present invention may be measured by the following method. Information of images photographed on a scanning electron microscope like the spherical PE particles particle diameter described later is inputted into an image analyzer (trade name: LUZEX 3; manufactured by Nireco Corp.), where, in respect of 50 particles picked up at random, their shape factor is calculated according to the following equation (1).

$$SF\text{-}1 = \{(MXLNG)^2/AREA\} \times (\pi/4) \times (100) \quad (1)$$

wherein MXLNG represents an absolute maximum length of a particle, and AREA represents a projected area of the particle.

The spherical PE particles have a higher crystallinity as the particles have a higher weight-average molecular weight, and can maintain a higher hardness, so that the particles themselves are by no means abraded even in sanding treatment making use of a grinding wheel or the like, and can be present at the elastic layer surface while being kept spherical. From the viewpoint of these, the spherical PE particles may preferably have a weight-average molecular weight (Mw) of 1,500,000 or more. Also, from the viewpoint of maintaining extrusion workability, the spherical PE particles may preferably have an Mw of 4,000,000 or less.

The spherical PE particles may preferably have a particle diameter of from 10 μm or more to 130 μm or less. As long as their particle diameter is 10 μm or more, the area of contact with the photosensitive member can more surely be kept from increasing because of the particle diameter that may otherwise be small. Also, as long as their particle diameter is 130 μm or less, the charging roller surface can be kept from being stained with a toner and so forth because of the elastic layer that may otherwise have a large surface roughness depending on the size of the particles. The spherical PE particles may further preferably have particle diameter in the range of from 10 μm or more to 30 μm or less.

In virtue of these spherical PE particles, the surface of the elastic layer stands roughened. As the degree to which the surface is roughened, it is preferable that the charging member surface (the surface of the elastic layer) has a ten-point average roughness Rz of from 3 μm or more to 30 μm or less. As long as their Rz is within this range, any image non-uniformity caused by roughness can more surely be kept from occurring.

The particle diameter of the spherical PE particles is "length-average particle diameter" determined by the following method. First, the spherical PE particles are observed on a scanning electron microscope (trade name: JEOL LV5910; manufactured by JEOL Ltd.) to perform image photography, and the images photographed are analyzed by using image analysis software (trade name: IMAGE-PRO PLUS; available from Planetron Co.). To make analysis, the number of pixels per unit length is calibrated from micron bars at the time of photography, where, in respect of 50 particles picked up at random from the photograph, their unidirectional particle diameters are measured from the number of pixels on the image to determine arithmetic mean particle diameter, which is taken as the particle diameter of the spherical PE particles.

The spherical PE particles in the elastic layer may preferably be in a content of from 5 parts by mass or more to 35 parts by mass or less in total, based on 100 parts by mass of a raw-material polymer component making up the elastic layer. As long as the spherical PE particles are in a content of 5 parts by mass or more, the particles can be present at the surface in a sufficient quantity and the area of contact with the photosensitive member can be made especially small. Also, as long as the spherical PE particles are in a content of 35 parts by mass or less, the elastic layer can be kept from being hard because of the particles that may otherwise be incorporated in a large quantity. Incidentally, where a thermosetting rubber is used in the elastic layer, the raw-material polymer component refers to a raw-material rubber, and, where a thermoplastic elastomer is used in the elastic layer, the raw-material polymer component refers to a raw-material elastomer.

In the present specification, the elastic layer means the elastic layer as a surface layer (also often "surface elastic layer") unless particularly noted. In the present invention, an adhesive layer may also be formed between the electro-conductive support and the surface elastic layer. The elastic layer may also be made into a multiple layer (may have at least one elastic layer other than the surface elastic layer), provided that, when made into a multiple layer, the layer containing the spherical PE particles (the surface elastic layer) must be formed at the outermost surface. Also, when the elastic layer is made into a multiple layer, it is preferable for the respective layer to be simultaneously shaped by using a multi-layer extruder in a method of extruding a rubber composition in the shape of a tube or a method of extruding it by using a cross head, as detailed later.

In the present invention, in order to most effectively simplify a production process, it is preferable for the elastic layer to be a single layer, i.e., to be only one elastic layer in the charging member according to the present invention. Then, as the thickness of the elastic layer in this case, it may preferably be in the range of from 0.8 mm or more to 4.0 mm or less, and particularly from 1.2 mm or more to 3.0 mm or less, from the viewpoint of securing the nip width between the elastic layer and the charging object member.

In the present invention, in the elastic layer, carbon black may be incorporated as conductive particles. The carbon black may be incorporated in an amount having been so regulated for the elastic layer to have electrical resistance at the desired value. However, the carbon black may preferably be incorporated in an amount of from 20 parts by mass or more to 70 parts by mass or less, based on 100 parts by mass of the raw-material polymer component making up the elastic layer. As long as the carbon black is incorporated in an amount of 20 parts by mass or more, the elastic layer can be kept from having a low hardness, to have an appropriate hardness with ease, and can be easily effective in sufficiently keeping any faulty cleaning from occurring. Also, as long as the carbon black is incorporated in an amount of 70 parts by mass or less, the elastic layer can be kept from having a high hardness, to have an appropriate hardness with ease. In addition, the elastic layer can more surely be kept from any faulty contact thereof with the photosensitive member because of the elastic layer that may otherwise have a high hardness, thus it can more surely keep a toner and any dirt such as paper dust from sticking to the charging member surface during its long-term service to cause faulty images.

To the elastic layer, a filler, a processing aid, a cross-linking agent, a cross-linking auxiliary, a cross-linking accelerator, a cross-linking accelerator activator, a cross-linking retarder, a softening agent, a plasticizer, a dispersant and/or the like may further optionally be added as compounding agents of rubber.

Charging Member Production Process

The charging member of the present invention may be produced by a production process having the following steps 1 to 3.

Step 1: The step of forming on the electro-conductive support a rubber layer containing the spherical PE particles.

Step 2: The step of sanding the surface of this rubber layer to make, about at least part of particles among the spherical PE particles, part of each particle exposed to the surface.

Step 3: The step of irradiating with electron rays the surface of the rubber layer having been sanded, further to cure the surface.

The respective steps are described below.

Step 1:

A rubber layer containing the spherical PE particles is formed on the electro-conductive support. Stated specifically, first, a mixture composed of elastic layer forming raw materials such as the base polymer and the spherical PE particles is prepared. As methods for mixing these raw materials, they may be exemplified by a method making use of a closed kneading machine such as Banbury mixer or a pressure kneader and a method making use of an open kneading machine such as an open roll. Here, where the base polymer is a thermoplastic rubber, the mixture is called a rubber composition. Also, where the base polymer is an unvulcanized thermoplastic rubber, the mixture is called an unvulcanized rubber composition. The rubber layer containing the spherical PE particles is one obtained by forming in a stated shape the mixture containing the spherical PE particles, and may be composed of the rubber composition or the unvulcanized rubber composition.

The mixture of these may be used in the forming of the rubber layer. The shape of the rubber layer may also appropriately be selected. For example, a tubular (cylindrical) rubber layer may be formed on the peripheral surface of a solid- or hollow-cylindrical conductive support to produce a roller-shaped rubber roller. Herein, the roller obtained by covering the support on its periphery with the rubber composition is called a rubber roller, and the roller obtained by covering the support on its periphery with the unvulcanized rubber composition is called an unvulcanized rubber roller. As to the unvulcanized rubber roller, it is then subjected to cross-linking processing or the like to effect curing to obtain a vulcanized rubber roller.

As a method for producing such a roller-shaped vulcanized rubber roller, it may specifically include the following methods (a) and (b).

(a) A method in which the unvulcanized rubber composition is extruded in the shape of a tube by means of an extruder and, to the product formed by vulcanizing the extruded product in a vulcanizer, the mandrel is press-fitted, followed by sanding of the surface to give the desired outer diameter.

(b) A method in which the unvulcanized rubber composition is co-extruded in the shape of a cylinder around the mandrel by means of an extruder fitted with a cross head, and the extruded product is set into a mold giving the desired outer diameter, followed by heating to obtain a formed product.

The unvulcanized rubber roller is vulcanized by heat treatment. As a specific example of a method for the heat treatment, it may include hot-air oven heating making use of a gear oven, superheating vulcanization making use of far infrared rays, and steam heating making use of a vulcanizing pan. In particular, the hot-air oven heating and the far infrared ray superheating are preferable because they are suited for continuous manufacture.

Step 2:

The surface of the rubber roller or unvulcanized rubber roller obtained through the step 1 is processed by sanding. This processing by sanding makes, about at least part of particles among the spherical PE particles contained in the elastic layer, part of each particle exposed to the surface. As a method of sanding the surface of the rubber roller (rubber layer), it may include, e.g., a traverse grinding system in which a grinding wheel or the roller is moved in the thrust direction of the roller to carry out grinding. It may also include a plunge-cut grinding system in which, while the roller is rotated around its mandrel shaft, the roller is cut with a grinding wheel having a width larger than the former's roller length, without reciprocating the latter.

Step 3:

Next, the surface of the rubber layer having been sanded (the rubber roller surface) is irradiated with electron rays to subject the surface to cure treatment to form the elastic layer having at its surface a region having been cured.

Figure 5:
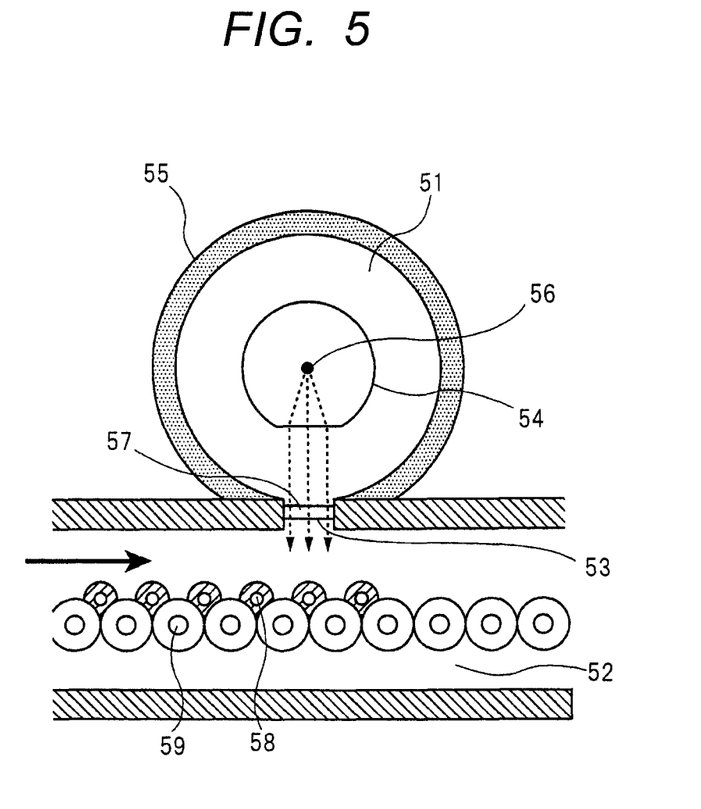
FIG. 5 is a schematic view showing an example of the construction of electron-ray irradiation equipment.

In the present invention, as electron-ray irradiation equipment, equipment may be used in which the roller surface is irradiated with electron rays while the rubber roller having been sanded is rolled or rotated, which is schematically shown in FIG. 5. This electron-ray irradiation equipment has an electron-ray generation part 51, an irradiation chamber 52 and an irradiation window 53.

The electron-ray generation part 51 has a terminal 54 at which electron rays are produced and an accelerating tube 55 which accelerates in a vacuum space (accelerating space) the electron rays produced at the terminal 54. Also, the interior of the electron-ray generation part is kept at a vacuum of from $10^{-3}$ Pa to $10^{-6}$ Pa by means of a vacuum pump (not shown) or the like in order to prevent electrons from colliding with gas molecules to lose energy.

A filament 56 is electrified by a power source (not shown) to come heated, whereupon the filament 56 emits thermions, and, among the thermions emitted, only those having passed through the terminal 54 are effectively taken out as electron rays. Then, the electron rays are accelerated in the accelerating space inside the accelerating tube 55 by electron ray accelerating voltage, and thereafter pierce through an irradiation window foil 57, where a rubber roller 58 having been sanded and being transported inside the irradiation chamber 52 provided beneath the irradiation window 53 is irradiated therewith.

Thus, when the rubber roller 58 having been sanded is irradiated with electron rays, the interior of the irradiation chamber 52 may be kept under an atmosphere of nitrogen. Also, the rubber roller 58 having been sanded is, being rolled with a roller rolling member 59, moved inside the irradiation chamber 52 by a transport means from the left side to the right side as viewed in FIG. 5. Incidentally, the electron-ray generation part 51 and the irradiation chamber 52 are kept by lead shielding (not shown) on their peripheries so that any X-rays produced secondarily during the irradiation with electron rays may not leak outside.

The irradiation window foil 57 is made of metal foil, and is a material which separates the vacuum atmosphere inside the electron-ray generation part from the aerial atmosphere inside the irradiation chamber. Through this irradiation window foil 57, the electron rays are taken out into the irradiation chamber 52. As mentioned above, when electron rays are used in irradiating the roller, the interior of the irradiation chamber 52, in which the roller is irradiated with electron rays, may be kept under an atmosphere of nitrogen. Accordingly, the irradiation window foil 57 provided at the boundary between the electron-ray generation part 51 and the irradiation chamber 52 is desired to have no pinholes, have a mechanical strength high enough to well maintain the vacuum atmosphere inside the electron-ray generation part, and readily allow the electron rays to transmit therethrough. Hence, it is desirable for the irradiation window foil 57 to be a metal having a low specific gravity and a small wall thickness, thus, usually, aluminum or titanium foil is used.

Conditions for effective treatment by electron rays depend on accelerating voltage and dose of the electron rays. The accelerating voltage influences cure treatment depth (also called cure treatment thickness or cured-region thickness), and, as conditions for the accelerating voltage used in the present invention, may preferably be in a low-energy range of from 40 kV or more to 300 kV or less. As long as it is 40 kV or more, a cure treatment depth sufficient for obtaining the effect of the present invention can easily be attained. Also, inasmuch as it is 300 kV or less, the electron-ray irradiation equipment can especially be prevented from otherwise coming large in size to involve a high equipment cost. As further preferable conditions for the accelerating voltage, it is from 80 kV or more to 150 kV or less.

The dose of electron rays in the irradiation with electron rays is defined by the following equation (2):

$$D=(K \cdot I)/V \qquad (2).$$

Here, D is the dose (kGy), K is an equipment constant, I is electron current (mA), and V is treatment speed (m/min). The equipment constant K is a constant representing the efficiency of individual equipment, and is an index of the performance of the equipment. The equipment constant K may be determined by measuring doses under conditions of a uniform accelerating voltage but changing the electron current and treatment speed.

To measure the dose of electron rays, a dose measuring film may be stuck to the roller surface, and this is actually treated with the electron-ray irradiation equipment, where the dose measuring film may be measured with a film dosimeter. On that occasion, a dose measuring film of trade name: FWT-60 and a film dosimeter of trade name: FWT-92 D Model (both manufactured by Far West Technology, Inc.) may be used.

The electron rays used in the present invention may preferably be in a dose of from 30 kGy or more to 3,000 kGy or less. As long as the dose is 30 kGy or more, a surface hardness sufficient for obtaining the effect of the present invention can easily be attained. Also, inasmuch as it is 3,000 kGy or less, the electron-ray irradiation equipment can especially be prevented from otherwise coming large in size, or involving a high equipment cost because of treatment time otherwise elongated. As further preferable conditions for the dose of electron rays, it is from 200 kGy or more to 2,000 kGy or less.

The spherical PE particles standing exposed to the elastic layer surface in the present invention are supported by a region having been cured by the irradiation with electron rays. Forms of the surface of the charging roller of the present invention are diagrammatically shown in FIGS. 3A and 3B. FIG. 3A shows a case in which such a cured region has a large thickness and FIG. 3B a case in which the cured region has a small thickness. The thickness of the cured region is not to be particularly specified, but may preferably be not less than 0.5 time the average particle diameter (length-average particle diameter) of the spherical PE particles to be used.

In as much as the cured region is in a thickness not less than 0.5 time the average particle diameter, the spherical PE particles standing exposed to the surface can more surely be kept from being buried in the elastic layer at the part of contact with the photosensitive member. The cured region may most preferably be in a thickness of from not less than the same value as the average particle diameter (not less than the average particle diameter) of the spherical PE particles to 200 μm or less. Inasmuch as the region cured by the irradiation with electron rays is in a thickness of 200 μm or less, a sufficient width of the nip between the charging roller and the photosensitive member can be secured with ease.

As described previously, the depth of cure treatment with electron rays may change depending on the accelerating voltage. It is also commonly known that the transmission depth of electron rays may differ depending on the density of the substance to be irradiated. Accordingly, as a method of ascertaining the thickness of an actual region having been cured by cure treatment, the measurement of surface hardness by using a universal hardness meter is available.

Universal hardness is a value of physical properties that is found by making indentation with an indenter to a measuring object under application of a load, and is found as the value (N/mm$^2$) of (testing load)/(surface area of penetrator under testing load). This universal hardness may be measured with a hardness measuring instrument as exemplified by an ultra-microhardness meter H-100V (trade name), manufactured by Helmut Fischer GmbH.

In this measuring instrument, a pyramid indenter or the like is forced into the measuring object under application of a stated relatively small test load, and, at a point of time where it has come to a stated indentation depth, the area of surface with which the indenter is in contact is determined from the indentation depth to find the universal hardness according to the above expression. That is, when the indenter is forced into the measuring object under conditions of constant load measurement, the stress on that occasion with respect to the depth of indentation is defined to be the universal hardness.

Figure 4:
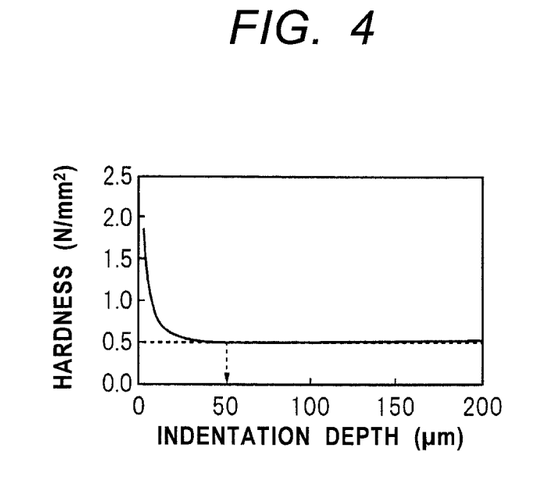
FIG. 4 is a graph showing an example of the results of measurement of universal hardness.

An example of the measurement of universal hardness is shown in FIG. 4. In the graph shown therein, the indentation depth (μm) is plotted as abscissa and the hardness (N/mm$^2$) as ordinate. As shown in FIG. 4, the value on abscissa at a point where a straight line extrapolated from a measurement region of from 150 μm or more to 200 μm or less on the abscissa, which shows a small change in hardness with respect to the indentation depth and is a straight-line region, comes to deviate from a measurement curve may be defined as the thickness of the cured region. Here, the thickness of the cured region in the measurement example shown in FIG. 4 is 50 μm.

EXAMPLES

The present invention is described below in greater detail by giving Examples. In the following, "part(s)" refers to "part(s) by mass" unless particularly noted. As reagents and the like, commercially available high-purity products are used unless particularly specified. In the respective Examples, charging rollers were produced.

Example 1

Preparation of Unvulcanized Rubber Composition for Elastic Layer

Materials shown in Table 1 below were mixed by means of a 6-liter pressure kneader (trade name: TD6-15MDX; manufactured by Toshin Co., Ltd.) for 16 minutes in a packing of 70 vol. % and at a number of blade revolutions of 30 rpm to obtain an A-kneaded rubber composition.

TABLE 1

| Materials | Part(s) by mass |
| --- | --- |
| Acrylonitrile-butadiene rubber (NBR) (trade name: N230SV; available from JSR Corporation) | 100 |
| Zinc stearate | 1 |
| Zinc oxide | 5 |
| Calcium carbonate (trade name: NANOX #30; available from Maruo Calcium Co., Ltd.) | 20 |
| Carbon black (trade name: TOKA BLACK #7400; available from Tokai Carbon Co., Ltd.) | 44 |
| Spherical polyethylene particles 1 (spherical PE particles 1) (trade name: HIZEX MILLION 320MU; available from Mitsui Chemicals, Inc. | 30 |

Next, materials shown in Table 2 below were mixed by means of an open roll of 12 inches (0.30 m) in roll diameter at a number of front-roll revolutions of 8 rpm and a number of back-roll revolutions of 10 rpm and at a roll gap of 2 mm, carrying out 20 cuts in total. Thereafter, the roll gap was changed to 0.5 mm to carry out tailing 10 times to obtain an unvulcanized rubber composition for elastic layer.

TABLE 2

| Materials | Parts by mass |
| --- | --- |
| A- kneaded rubber composition | 200 |
| Sulfur | 1.2 |
| Tetrabenzylthiuram disulfide [trade name: NOCCELLER TBzTD (simply "TBzTD"); available from Ohuchi-Shinko Chemical Industrial Co., Ltd.] | 4.5 |

Forming of Vulcanized Rubber Layer:

A columnar conductive support (made of steel and plated with nickel on its surface) of 6 mm in diameter and 252 mm in length was coated with a conductive vulcanization adhesive (trade name: METALOC U-20; available from Toyokagaku Kenkyusho Co., Ltd.) over the column surface on its middle portion of 228 mm in axial direction, followed by drying at 80° C. for 30 minutes.

Next, the above unvulcanized rubber composition was extruded together with the electro-conductive support while being shaped coaxially around the electro-conductive support and in the shape of a cylinder, by extrusion making use of a cross head to produce an unvulcanized rubber roller of 8.8 mm in diameter which was coated with the unvulcanized rubber composition on the outer periphery of the electro-conductive support. As an extruder, an extruder having a cylinder diameter of 45 mm (45 diam.) and an L/D of 20 was used, making temperature control to 90° C. for a head, 90° C. for a cylinder and 90° C. for a screw at the time of extrusion.

The layer of unvulcanized rubber composition of the unvulcanized rubber roller thus shaped was cut at both end portions in its width direction to make the layer of unvulcanized rubber composition be 226 mm in its axial length. Thereafter, this was heated at 160° C. for 40 minutes by means of an electric furnace to vulcanize the layer of unvulcanized rubber composition to make it into a vulcanized rubber layer. Subsequently, the vulcanized rubber layer was sanded on its surface by means of a sander of a plunge-cut grinding system to obtain a vulcanized rubber roller having a vulcanized rubber layer with a crown shape of 8.35 mm in end-portion diameter and 8.50 mm in middle-portion diameter and part of the spherical PE particles of which stood exposed to the surface.

Measurement of Hardness of Vulcanized Rubber Layer:

The MD-1 hardness of the vulcanized rubber layer standing before the irradiation with electron rays (before EB treatment) was measured. In the measurement, a microhardness meter (trade name: MD-1 capa; manufactured by Kobunshi Keiki Co., Ltd.) was used to make measurement in a peak-hold mode in an environment of temperature 23° C. and relative humidity 55%. Stated more specifically, the vulcanized rubber roller was placed on a plate made of a metal, and a block made of a metal was placed to simply fasten the vulcanized rubber roller so as not to roll over. Then, a type-A measuring terminal was pressed against the metal plate accurately at the center of the vulcanized rubber roller in the direction vertical to the metal plate, where a value after 5 seconds was read. This was measured at both end portions positioned 30 to 40 mm away from rubber ends of the vulcanized rubber roller in its axial direction and the middle portion thereof, and at 3 spots each in the peripheral direction, i.e., at 9 spots in total. An average value of the measured values obtained was taken as the MD-1 hardness of the vulcanized rubber layer. As the result, the vulcanized rubber layer was found to have an MD-1 hardness of 76°.

Surface Cure Treatment of Vulcanized Rubber Layer Having been Sanded:

The surface of the vulcanized rubber roller having been sanded (the vulcanized rubber layer surface) was irradiated with electron rays to carry out cure treatment to obtain a charging roller having a cured region at the surface of its elastic layer. In the irradiation with electron rays, electron-ray irradiation equipment (manufactured by Iwasaki Electric Co., Ltd.) of 150 kV in maximum accelerating voltage and 40 mA in maximum electron current was used, and nitrogen gas purging was carried out at the time of the irradiation with electron rays. Treatment conditions were accelerating voltage: 150 kV, electron current: 35 mA, treatment rate: 1 m/min, and oxygen concentration: 100 ppm. Here, the equipment constant at the accelerating voltage of 150 kV of the electron-ray irradiation equipment was 37.8, and the dose calculated according to the equation (2) was 1,323 kGy.

Measurement of Hardness of Vulcanized Rubber Layer Having been Irradiated with Electron Rays:

The MD-1 hardness of the vulcanized rubber layer having been irradiated with electron rays was measured in the same way as the method used before irradiation with electron rays. As the result, the vulcanized rubber layer was found to have an MD-1 hardness of 85°.

Measurement of Thickness of Cured Region:

The surface hardness of the charging roller was measured with a universal hardness meter, thereby measuring its cure treatment thickness. An ultra-microhardness meter (trade name: H-100V; manufactured by Helmut Fischer GmbH) was used in the measurement. A pyramid diamond indenter was also used as an indenter. Indentation rate was conditioned to be the following equation (3):

$$dF/dt = 1{,}000 \text{ mN}/240 \text{ s} \qquad (3).$$

In the equation (3), F represents force, and t represents time.

As shown in FIG. 4, the value on abscissa at a point where a straight line extrapolated from a measurement region of from 150 µm or more to 200 µm or less on the abscissa, which showed a small change in hardness with respect to the indentation depth, came to deviate from a measurement curve was found as the thickness of the cured region. As the result, the thickness of the cured region was found to be 90 µm.

Measurement of Surface Roughness:

Ten-point average surface roughness Rz of the charging roller (elastic layer) was measured. It was measured according to JIS B0601:1982, using a surface roughness meter (trade name: SURFCORDER SE-3400; manufactured by Kosaka Laboratory, Ltd.). In the measurement, a contact stylus made of diamond was used which had a tip radius of 2 µm. Measurement speed was set to be 0.5 mm/s; cut-off frequency λc, 0.8 mm; standard length, 0.8 mm; and evaluation length, 8.0 mm. To measure the surface roughness, the values of Rz were calculated from roughness curves obtained respectively on 3 spots in the axial direction×2 spots in the peripheral direction, i.e., 6 spots in total, per each charging roller. Then, the average value of Rz at these 6 spots was found, and this was taken as the value of Rz of the charging roller. As the result, the Rz was found to be 29.5 µm.

Image Evaluation:

A laser beam printer (trade name: LASER JET P1005; manufactured by Hewlett-Packard Co.; for A4-paper lengthwise printing, and using an elastic blade as a cleaning member) was readied as an electrophotographic apparatus used in the evaluation. The charging roller produced as above was set in a process cartridge for the laser beam printer, and this process cartridge was mounted to the laser beam printer. In an environment of temperature 23° C. and relative humidity 50%, a solid image and a halftone image (an image in which lines each being 1 dot in width and 2 dots in space were drawn in the rotational direction and vertical direction of an electrophotographic photosensitive member) were each reproduced on one sheet. These are called an initial-stage solid image and an initial-stage halftone image, respectively.

Next, after such electrophotographic images were reproduced on one sheet each, a running test was conducted in which an intermittent motion of image formation such that the rotation of the electrophotographic photosensitive member was completely stopped and then a motion of image formation was again started was repeated to reproduce electrophotographic images on 1,000 sheets. The images reproduced here were images in the shape of ruled lines in which a 118-dot space was repeated after every 2-dot horizontal line.

Then, the solid image and the halftone image were each reproduced on one sheet. These are called an after-running-test solid image and an after-running-test halftone image, respectively. Then, about two sheets of paper of the solid image and two sheets of paper of the halftone image thus obtained, whether or not any density non-uniformity caused by non-uniform charging was seen and how much it was were visually observed to make evaluation according to the following criteria.

Evaluation (1): Evaluation of Charging Performance (Initial Stage and after Running):

The initial-stage solid image and the initial-stage halftone image were visually observed on whether or not any density non-uniformity caused by non-uniform charging was seen, to make evaluation according to the following criteria. The after-running-test solid image and the after-running-test halftone image were also likewise observed to make evaluation alike. This can tell charging performance at the initial-stage and after the running test of the charging roller according to Example 1.

A: Any density non-uniformity caused by non-uniform charging is not seen in both the solid image and the halftone image.
B: Slight density non-uniformity caused by non-uniform charging is seen only in the halftone image.
C: Density non-uniformity is seen in the halftone image, and also slight density non-uniformity caused by non-uniform charging is seen in the solid image.
D: Distinct density non-uniformity caused by non-uniform charging is seen in both the solid image and the halftone image.

Evaluation (2): Evaluation on any Image Defects Caused by Faulty Cleaning:

The images on 1,000 sheets which were reproduced in the above running test were visually observed on whether or not any image defects caused by faulty cleaning of the photosensitive member were seen and how much they were, to make evaluation according to the following criteria.

A: Any only one sheet of print is not seen on which the image defects caused by faulty cleaning have occurred.
B: The number of sheet(s) of print on which any very slight image defects caused by faulty cleaning have occurred is one sheet or more to less than 100 sheets.
C: The number of sheet(s) of print on which any clear image defects caused by faulty cleaning have occurred is one sheet or more to less than 100 sheets.
D: The number of sheets of print on which any clear image defects caused by faulty cleaning have occurred is 100 sheets or more.

Evaluation (3): Evaluation of Torque Between Photosensitive Member and Elastic Blade:

An elastic blade was brought into contact in the counter direction with the surface of the photosensitive member of the laser beam printer used in the above image formation, in the state of which the torque between the photosensitive member and the elastic blade was measured. This measurement can tell whether or not any sticking of toner and so forth which was caused by the charging roller was seen or how much it was.

As a method for measurement, first, in the laser beam printer, a unit portion where the photosensitive member and the elastic blade were set in was taken out of its process cartridge. Then, a motor to which a torque meter (trade name: TP-10KCE; manufactured by Kyowa Electronic Instruments Co., Ltd.) was connected was connected to a drive unit for the photosensitive member, and the torque acting when the photosensitive member was rotated with the motor at a number of revolutions of 85 rpm was measured with the torque meter, where an average value of measured values corresponding to one round of the fourth rotation from the start of rotation of the photosensitive member was taken as the value of torque in Example 1.

The results of the above Evaluations 1 to 3 are shown in Table 4.

Example 2

A vulcanized rubber roller having been sanded was produced in the same way as Example 1 except that the spherical PE particles 1 used in the A-kneaded rubber composition of Example 1 were changed for spherical PE particles 2 (trade name: HIZEX MILLION 240S; available from Mitsui Chemicals, Inc.) and the spherical PE particles 2 were mixed in an amount of 35 parts by mass. The hardness of its vulcanized rubber layer was measured in the same way as Example 1 to find that it was 78°. Subsequently, the surface of the vulcanized rubber roller having been sanded was subjected to cure treatment by irradiation with electron rays in the same way as Example 1 to produce a charging roller, and the measurement of its cure treatment thickness, the measurement of its surface roughness and the image evaluation were made alike.

Example 3

An unvulcanized rubber composition for elastic layer was prepared and a vulcanized rubber roller having been sanded was produced both in the same way as Example 2 except that the polymer (raw material) used in the A-kneaded rubber composition of Example 2 was changed for 55 parts of NBR and 45 parts of SBR (trade name: TOUGHDEN 2000; available from Asahi Kasei Chemicals Corporation) and the spherical PE particles 2 were mixed in an amount changed to 30 parts by mass. The hardness of the vulcanized rubber layer of the vulcanized rubber roller having been sanded was measured in the same way as Example 2 to find that it was 76°. Subsequently, the surface of the vulcanized rubber roller having been sanded was subjected to cure treatment by irradiation with electron rays in the same way as Example 2 to produce a charging roller, and the measurement of its cure treatment thickness, the measurement of its surface roughness and the image evaluation were made alike.

Example 4

An unvulcanized rubber composition for elastic layer was prepared and a vulcanized rubber roller having been sanded was produced both in the same way as Example 1 except that the spherical PE particles 1 used in the A-kneaded rubber composition of Example 1 were changed for the like parts by mass of spherical PE particles 3 (trade name: PM-200; available from Mitsui Chemicals, Inc.). The hardness of the vulcanized rubber layer of the vulcanized rubber roller having been sanded was measured in the same way as Example 1 to find that it was 77°. Subsequently, the surface of the vulcanized rubber roller having been sanded was subjected to cure treatment by irradiation with electron rays in the same way as Example 1 to produce a charging roller, and the measurement of its cure treatment thickness, the measurement of its surface roughness and the image evaluation were made alike.

Example 5

An unvulcanized rubber composition for elastic layer was prepared and a vulcanized rubber roller having been sanded was produced both in the same way as Example 1 except that the spherical PE particles 1 used in the A-kneaded rubber composition of Example 1 were changed for the like parts by mass of spherical PE particles 4 (trade name: MIPELON XM-220; available from Mitsui Chemicals, Inc.). The hardness of the vulcanized rubber layer of the vulcanized rubber roller having been sanded was measured in the same way as Example 1 to find that it was 77°. Subsequently, the surface of the vulcanized rubber roller having been sanded was subjected to cure treatment by irradiation with electron rays in the same way as Example 1 to produce a charging roller, and the measurement of its cure treatment thickness, the measurement of its surface roughness and the image evaluation were made alike.

Example 6

An unvulcanized rubber composition for elastic layer was prepared and a vulcanized rubber roller having been sanded was produced both in the same way as Example 1 except that the spherical PE particles 1 used in the A-kneaded rubber composition of Example 1 were changed for spherical PE particles 4 (trade name: MIPELON XM-220; available from Mitsui Chemicals, Inc.) which were mixed in an amount of 10 parts by mass. The hardness of the vulcanized rubber layer of the vulcanized rubber roller having been sanded was measured in the same way as Example 1 to find that it was 69°. Subsequently, the surface of the vulcanized rubber roller having been sanded was subjected to cure treatment by irradiation with electron rays in the same way as Example 1 to produce a charging roller, and the measurement of its cure treatment thickness, the measurement of its surface roughness and the image evaluation were made alike.

Example 7

An unvulcanized rubber composition for elastic layer was prepared and a vulcanized rubber roller having been sanded was produced both in the same way as Example 6 except that the spherical PE particles 4 used in the A-kneaded rubber composition of Example 6 were mixed in an amount of 40 parts by mass. The hardness of the vulcanized rubber layer of the vulcanized rubber roller having been sanded was measured in the same way as Example 1 to find that it was 79°. Subsequently, the surface of the vulcanized rubber roller having been sanded was subjected to cure treatment by irradiation with electron rays in the same way as Example 1 to produce a charging roller, and the measurement of its cure treatment thickness, the measurement of its surface roughness and the image evaluation were made alike.

Example 8

A charging roller was produced in all the same way as Example 5 except that the conditions for irradiation with electron rays in Example 5 were changed to accelerating voltage: 80 kV, electron current: 25 mA, treatment rate: 1 m/min, and oxygen concentration: 100 ppm. Here, the equipment constant at the accelerating voltage of 80 kV of the electron-ray irradiation equipment was 20.4, and the dose calculated according to the equation (2) was 510 kGy. The hardness of the vulcanized rubber layer was measured in the same way as Example 1 to find that it was 77°. Subsequently, the surface of the vulcanized rubber roller having been sanded was subjected to cure treatment by irradiation with electron rays in the same way as Example 1 to produce a charging roller, and the measurement of its cure treatment thickness, the measurement of its surface roughness and the image evaluation were made alike.

Example 9

A charging roller was produced in all the same way as Example 5 except that the conditions for irradiation with electron rays in Example 5 were changed to accelerating voltage: 150 kV, electron current: 60 mA, treatment rate: 1 m/min, and oxygen concentration: 100 ppm. Here, the equipment constant at the accelerating voltage of 150 kV of the electron-ray irradiation equipment was 37.8, and the dose calculated according to the equation (2) was 2,268 kGy. The hardness of the vulcanized rubber layer was measured in the same way as Example 1 to find that it was 77°. Subsequently, the surface of the vulcanized rubber roller having been sanded was subjected to cure treatment by irradiation with electron rays in the same way as Example 1 to produce a charging roller, and the measurement of its cure treatment thickness, the measurement of its surface roughness and the image evaluation were made alike.

Example 10

A charging roller was produced in all the same way as Example 5 except that the conditions for irradiation with electron rays in Example 5 were changed to accelerating voltage: 150 kV, electron current: 75 mA, treatment rate: 1 m/min, and oxygen concentration: 100 ppm and that the spherical PE particles were used in an amount changed to 10 parts by mass. Here, the equipment constant at the accelerating voltage of 150 kV of the electron-ray irradiation equipment was 37.8, and the dose calculated according to the equation (2) was 2,835 kGy. The hardness of the vulcanized rubber layer was measured in the same way as Example 1 to find that it was 69°. Subsequently, the surface of the vulcanized rubber roller having been sanded was subjected to cure treatment by irradiation with electron rays in the same way as Example 1 to produce a charging roller, and the measurement of its cure treatment thickness, the measurement of its surface roughness and the image evaluation were made alike.

Example 11

A charging roller was produced in all the same way as Example 5 except that the conditions for irradiation with electron rays in Example 5 were changed to accelerating voltage: 80 kV, electron current: 5 mA, treatment rate: 1 m/min, and oxygen concentration: 100 ppm. Here, the equipment constant at the accelerating voltage of 80 kV of the electron-ray irradiation equipment was 20.4, and the dose calculated according to the equation (2) was 102 kGy. The hardness of the vulcanized rubber layer was measured in the same way as Example 1 to find that it was 76°. Subsequently, the surface of the vulcanized rubber roller having been sanded was subjected to cure treatment by irradiation with electron rays in the same way as Example 1 to produce a charging roller, and the measurement of its cure treatment thickness, the measurement of its surface roughness and the image evaluation were made alike.

Example 12

A charging roller was produced in all the same way as Example 5 except that the conditions for irradiation with electron rays in Example 5 were changed to accelerating voltage: 80 kV, electron current: 10 mA, treatment rate: 1 m/min, and oxygen concentration: 100 ppm. Here, the equipment constant at the accelerating voltage of 80 kV of the electron-ray irradiation equipment was 20.4, and the dose calculated according to the equation (2) was 204 kGy. The hardness of the vulcanized rubber layer was measured in the same way as Example 1 to find that it was 76°. Subsequently, the surface of the vulcanized rubber roller having been sanded was subjected to cure treatment by irradiation with electron rays in the same way as Example 1 to produce a charging roller, and the measurement of its cure treatment thickness, the measurement of its surface roughness and the image evaluation were made alike.

Comparative Example 1

An unvulcanized rubber composition for elastic layer was prepared and a vulcanized rubber roller having been sanded was produced both in the same way as Example 1 except that any spherical particles were not added to the A-kneaded rubber composition of Example 1 and the A-kneaded rubber composition in the unvulcanized rubber composition was in an amount changed to 170 parts by mass. The hardness of the vulcanized rubber layer of the vulcanized rubber roller having been sanded was measured in the same way as Example 1 to find that it was 68°. Subsequently, the surface of the vulcanized rubber roller having been sanded was subjected to cure treatment by irradiation with electron rays in the same way as Example 1 to produce a charging roller, and the measurement of its cure treatment thickness, the measurement of its surface roughness and the image evaluation were made alike.

Comparative Example 2

An unvulcanized rubber composition for elastic layer was prepared and a vulcanized rubber roller having been sanded was produced both in the same way as Example 1 except that the spherical PE particles 1 used in the A-kneaded rubber composition of Example 1 was changed for 35 parts by mass of spherical urethane particles (trade name: ART PEARL C600; available from Negami Chemical Industrial Co., Ltd.). The hardness of the vulcanized rubber layer of the vulcanized rubber roller having been sanded was measured in the same way as Example 1 to find that it was 78°. Subsequently, the surface of the vulcanized rubber roller having been sanded was subjected to cure treatment by irradiation with electron rays in the same way as Example 1 to produce a charging roller, and the measurement of its cure treatment thickness, the measurement of its surface roughness and the image evaluation were made alike.

Comparative Example 3

An unvulcanized rubber composition for elastic layer was prepared and a vulcanized rubber roller having been sanded was produced both in the same way as Example 1 except that the spherical PE particles 1 used in the A-kneaded rubber composition of Example 1 was changed for 35 parts by mass of spherical PMMA (polymethyl methacrylate) particles (trade name: TECHPOLYMER MBX-12; available from Sekisui Chemical Co., Ltd.). The hardness of the vulcanized rubber layer of the vulcanized rubber roller having been sanded was measured in the same way as Example 1 to find that it was 78°. Subsequently, the surface of the vulcanized rubber roller having been sanded was subjected to cure treatment by irradiation with electron rays in the same way as Example 1 to produce a charging roller, and the measurement of its cure treatment thickness, the measurement of its surface roughness and the image evaluation were made alike.

Comparative Example 4

A charging roller was produced in the same way as that of Example 5 except that, in Example 5, the surface of the vulcanized rubber roller having been sanded was not irradiated with electron rays. The measurement of charging roller surface roughness and the image evaluation were made alike.

Characteristics of the spherical PE particles and other particles used in the above Examples and Comparative Examples are shown in Table 3. Composition and evaluation results of the rollers according to Examples are shown in Tables 4 and 5. Composition and evaluation results of the rollers according to Comparative Examples are also shown in Table 6.

TABLE 3

|  | Shape | Shape factor (SF-1) | Length-average particle diameter (μm) |
|---|---|---|---|
| Spherical PE particles 1 | Spherical | 151 | 150 |
| Spherical PE particles 2 | Spherical | 142 | 130 |
| Spherical PE particles 3 | Spherical | 103 | 10 |
| Spherical PE particles 4 | Spherical | 104 | 30 |
| Spherical urethane particles | Spherical | 111 | 10 |
| Spherical PMMA particles | Spherical | 105 | 12 |

TABLE 4

|  |  |  | Example: | | | | | |
|---|---|---|---|---|---|---|---|---|
|  |  |  | 1 | 2 | 3 | 4 | 5 | 6 |
| NBR |  |  | 100 | 100 | 55 | 100 | 100 | 100 |
| SBR |  |  | — | — | 45 | — | — | — |
| Zinc stearate |  |  | 1 | 1 | 1 | 1 | 1 | 1 |
| Zinc oxide |  |  | 5 | 5 | 5 | 5 | 5 | 5 |
| Calcium carbonate |  |  | 20 | 20 | 20 | 20 | 20 | 20 |
| Carbon black |  |  | 44 | 44 | 44 | 44 | 44 | 44 |
| Spherical particles | Length-av. particle diam. (μm) | Mw |  |  |  |  |  |  |
| Spherical PE particles 1 | 150 | 3,000,000 | 30 | — | — | — | — | — |
| Spherical PE particles 2 | 130 | 500,000 |  | 35 | 30 |  |  |  |
| Spherical PE particles 3 | 10 | 2,000,000 |  |  |  | 30 |  |  |
| Spherical PE particles 4 | 30 | 2,000,000 |  |  |  |  | 30 | 10 |

TABLE 4-continued

|  | Example: 1 | 2 | 3 | 4 | 5 | 6 |
|---|---|---|---|---|---|---|
| A-kneaded rubber content | 200 | 205 | 200 | 200 | 200 | 180 |
| Sulfur | 1.2 | 1.2 | 1.2 | 1.2 | 1.2 | 1.2 |
| Vulcanization accelerator (TBzTD) | 4.5 | 4.5 | 4.5 | 4.5 | 4.5 | 4.5 |
| Elastic layer MD-1 hardness: |  |  |  |  |  |  |
| Before EB treatment (°) | 76 | 78 | 76 | 77 | 77 | 69 |
| After EB treatment (°) | 85 | 87 | 84 | 85 | 87 | 77 |
| Electron rays irradiation conditions |  |  |  |  |  |  |
| Accelerating voltage (kV) | 150 | 150 | 150 | 150 | 150 | 150 |
| Dose (kGy) | 1,323 | 1,323 | 1,323 | 1,323 | 1,323 | 1,323 |
| Current (mA) | 35 | 35 | 35 | 35 | 35 | 35 |
| Surface roughness Rz (μm) | 29.5 | 26.8 | 27.6 | 9.9 | 14.9 | 13.8 |
| Cured-layer thickness (μm) | 90 | 90 | 80 | 90 | 90 | 90 |
| Image evaluation |  |  |  |  |  |  |
| (1) initial stage | B | B | B | A | A | A |
| (1) after running | B | B | B | A | A | A |
| (2) Faulty cleaning | A | B | A | A | A | A |
| (3) Torque (N · m) | 0.142 | 0.147 | 0.155 | 0.139 | 0.131 | 0.145 |

TABLE 5

|  |  |  | Example: 7 | 8 | 9 | 10 | 11 | 12 |
|---|---|---|---|---|---|---|---|---|
| NBR |  |  | 100 | 100 | 100 | 100 | 100 | 100 |
| Zinc stearate |  |  | 1 | 1 | 1 | 1 | 1 | 1 |
| Zinc oxide |  |  | 5 | 5 | 5 | 5 | 5 | 5 |
| Calcium carbonate |  |  | 20 | 20 | 20 | 20 | 20 | 20 |
| Carbon black |  |  | 44 | 44 | 44 | 44 | 44 | 44 |
| Spherical particles | Length-av. particle diam. (μm) | Mw |  |  |  |  |  |  |
| Spherical PE particles 4 | 30 | 2,000,000 | 40 | 30 | 30 | 10 | 30 | 30 |
| A-kneaded rubber content |  |  | 210 | 200 | 200 | 180 | 200 | 200 |
| Sulfur |  |  | 1.2 | 1.2 | 1.2 | 1.2 | 1.2 | 1.2 |
| Vulcanization accelerator (TBzTD) |  |  | 4.5 | 4.5 | 4.5 | 4.5 | 4.5 | 4.5 |
| Elastic layer MD-1 hardness: |  |  |  |  |  |  |  |  |
| Before EB treatment (°) |  |  | 79 | 77 | 77 | 69 | 76 | 76 |
| After EB treatment (°) |  |  | 86 | 85 | 85 | 75 | 77 | 77 |
| Electron rays irradiation conditions |  |  |  |  |  |  |  |  |
| Accelerating voltage (kV) |  |  | 150 | 80 | 150 | 150 | 80 | 80 |
| Dose (kGy) |  |  | 1,323 | 510 | 2,268 | 2,835 | 102 | 204 |
| Current (mA) |  |  | 35 | 25 | 60 | 75 | 5 | 10 |
| Surface roughness Rz (μm) |  |  | 15.4 | 14.0 | 13.8 | 13.8 | 13.8 | 13.8 |
| Cured-layer thickness (μm) |  |  | 90 | 30 | 200 | 220 | 10 | 15 |
| Image evaluation |  |  |  |  |  |  |  |  |
| (1) initial stage |  |  | A | A | A | A | A | A |
| (1) after running |  |  | A | A | A | B | B | B |
| (2) Faulty cleaning |  |  | A | A | A | A | A | A |
| (3) Torque (N · m) |  |  | 0.137 | 0.151 | 0.137 | 0.149 | 0.169 | 0.158 |

TABLE 6

|  | Comparative Example: 1 | 2 | 3 | 4 |
|---|---|---|---|---|
| NBR | 100 | 100 | 100 | 100 |
| Zinc stearate | 1 | 1 | 1 | 1 |
| Zinc oxide | 5 | 5 | 5 | 5 |
| Calcium carbonate | 20 | 20 | 20 | 20 |
| Carbon black | 44 | 44 | 44 | 44 |

TABLE 6-continued

| | | | Comparative Example: | | | |
|---|---|---|---|---|---|---|
| | | | 1 | 2 | 3 | 4 |
| Spherical particles | Length-av. particle diam. (μm) | Mw | | | | |
| Spherical PE particles 4 | 30 | 2,000,000 | — | — | — | 30 |
| Spherical urethane particles | 10 | — | — | 35 | — | — |
| Spherical PMMA particles | 12 | — | — | — | 35 | — |
| A-kneaded rubber content | | | 170 | 205 | 205 | 200 |
| Sulfur | | | 1.2 | 1.2 | 1.2 | 1.2 |
| Vulcanization accelerator (TBzTD) | | | 4.5 | 4.5 | 4.5 | 4.5 |
| Elastic layer MD-1 hardness: | | | | | | |
| Before EB treatment (°) | | | 68 | 78 | 78 | 76 |
| After EB treatment (°) | | | — | 85 | 85 | — |
| Electron rays irradiation conditions | | | | | | |
| Accelerating voltage (kV) | | | 150 | 150 | 150 | Not irradiated |
| Dose (kGy) | | | 1,323 | 1,323 | 1,323 | |
| Current (mA) | | | 35 | 35 | 35 | |
| Surface roughness Rz (μm) | | | 4.3 | 4.9 | 4.1 | 13.8 |
| Cured-layer thickness (μm) | | | 90 | 90 | 90 | — |
| Image evaluation | | | | | | |
| (1) initial stage | | | A | A | A | A |
| (1) after running | | | A | D | D | D |
| (2) Faulty cleaning | | | D | C | C | C |
| (3) Torque (N · m) | | | 0.186 | 0.185 | 0.183 | 0.181 |

As is clear from Table 6, in Comparative Example 1, any spherical particles are not used, and faulty cleaning has occurred because any spherical particles are not present at the surface of the charging roller (elastic layer), thus the image evaluation concerning the faulty cleaning is ranked as "D".

In Comparative Example 2, spherical particles are urethane particles, and hence the particles themselves have also abraded when the roller surface is sanded, resulting in faulty cleaning ranked as "C". In Comparative Example 3, the spherical particles are PMMA particles, and hence the particles themselves have also abraded when the roller surface is sanded, resulting in faulty cleaning ranked as "C".

In Comparative Example 4, the roller surface is not irradiated with electron rays, and hence faulty cleaning has occurred; being ranked as "C". Faulty image has also occurred during running because of charging roller staining; being ranked as "D".

In contrast thereto, in Examples 1 to 12, as shown in Tables 4 and 5, the image evaluation concerning faulty cleaning and the charging uniformity after running as well are ranked as "B" or higher, where good images free of any problem in practical use have been obtained.

This application claims priority from Japanese Patent Application No. 2011-281780, filed on Dec. 22, 2011, which is herein incorporated by reference as part of this application.

What is claimed is:

1. A process for producing a charging member comprising an electro-conductive support and an elastic layer as a surface layer, the elastic layer being formed by irradiating an outer peripheral surface of a vulcanized rubber layer with an electron ray, the elastic layer being a single layer and a sole layer, and having a cured region resulting from the irradiation with the electron ray only at an outer peripheral surface portion thereof, wherein the cured region has a hardness higher than a hardness of an interior portion of the elastic layer, and the cured region supporting spherical polyethylene particles in such a state that the spherical polyethylene particles are exposed to an outer peripheral surface of the charging member, and the outer peripheral surface of the charging member being thereby roughened; the process comprising the steps of:
   (1) forming the vulcanized rubber layer on an outer peripheral surface of the electro-conductive support, the vulcanized rubber layer containing the spherical polyethylene particles;
   (2) sanding the outer peripheral surface of the vulcanized rubber layer to make part of the spherical polyethylene particles exposed to the outer peripheral surface of the vulcanized rubber layer; and
   (3) irradiating with the electron ray the outer peripheral surface of the vulcanized rubber layer to which part of the spherical polyethylene particles stand exposed, obtained by the step (2), to form at the outer peripheral surface of the vulcanized rubber layer the cured region.

2. A charging member comprising:
   an electro-conductive support; and
   an elastic layer as a surface layer, the elastic layer being formed on an outer peripheral surface of the electro-conductive support by irradiating a vulcanized rubber layer with an electron ray,
   wherein the elastic layer is a single layer and a sole layer, and has a cured region resulting from the irradiation with the electron ray only at an outer peripheral surface portion thereof,
   wherein the cured region has a hardness higher than a hardness of an interior portion of the elastic layer, and
   wherein the cured region supports spherical polyethylene particles in such a state that the spherical polyethylene particles are exposed to an outer peripheral surface of the charging member, and the outer peripheral surface of the charging member is thereby roughened.

3. The charging member according to claim 2, wherein the cured region has a thickness of not less than 0.5 time the length-average particle diameter of the spherical polyethylene particles.

4. The charging member according to claim 3, wherein the thickness of the cured region is from not less than the length-average particle diameter of the spherical polyethylene particles to 200 μm or less.

5. The charging member according to claim 2, wherein the spherical polyethylene particles have a length-average particle diameter of from 10 μm or more to 130 μm or less.

6. The charging member according to claim 2, wherein the spherical polyethylene particles have a weight-average molecular weight of 1,500,000 or more to 4,000,000 or less.

7. The charging member according to claim 2, wherein the elastic layer has a thickness of from 0.8 mm or more to 4.0 mm or less.

8. An electrophotographic apparatus comprising:
the charging member according to claim 2; and
a charging object member that is disposed in contact with the charging member and is electrostatically chargeable by the charging member.

\* \* \* \* \*